US012203213B2

(12) United States Patent
Almasanu et al.

(10) Patent No.: US 12,203,213 B2
(45) Date of Patent: Jan. 21, 2025

(54) TEXTILE ARTICLE HAVING A SURFACE FOR RECEIVING REMOVABLE INDICIA AND A METHOD OF MANUFACTURE

(71) Applicants: Wendy Gross Almasanu, Columbus, OH (US); Sondra Gross Mansfield, New York, NY (US)

(72) Inventors: Wendy Gross Almasanu, Columbus, OH (US); Sondra Gross Mansfield, New York, NY (US)

(73) Assignee: Origin8 Studio LLC, New York, NY (US)

( * ) Notice: Subject to any disclaimer, the term of this patent is extended or adjusted under 35 U.S.C. 154(b) by 824 days.

(21) Appl. No.: 15/384,801

(22) Filed: Dec. 20, 2016

(65) Prior Publication Data

US 2017/0173994 A1 Jun. 22, 2017

Related U.S. Application Data

(60) Provisional application No. 62/270,867, filed on Dec. 22, 2015.

(51) Int. Cl.
*D06Q 1/00* (2006.01)
*B43L 1/00* (2006.01)

(52) U.S. Cl.
CPC . *D06Q 1/00* (2013.01); *B43L 1/00* (2013.01)

(58) Field of Classification Search
CPC ........................................................ D06Q 1/00
USPC ............................................................ 434/84
See application file for complete search history.

(56) References Cited

U.S. PATENT DOCUMENTS 3,760,724 A * 9/1973 Budzinski ................ B41M 7/00 101/488
4,627,110 A * 12/1986 Tengs ....................... A41D 1/04 2/115
5,253,368 A * 10/1993 Blake ..................... B43K 29/00 40/329
6,421,832 B1 7/2002 Ondrejko et al.
(Continued)

FOREIGN PATENT DOCUMENTS

GB 2429631 A * 3/2007 ............. A41D 27/08

OTHER PUBLICATIONS

"Mesh Help: Choosing the Right Mesh Can be Tricky," Anthem Screen Printing Supplies and Services, https://web.archive.org/web/20150822121336/http://www.anthemprintingsf.com:80/Choosing-Your-Mesh-Count-s/277.htm, Aug. 22, 2015 (Year: 2015).*
(Continued)

*Primary Examiner* — Robert P Bullington
*Assistant Examiner* — Stephen Alvesteffer
(74) *Attorney, Agent, or Firm* — Venable LLP

(57) ABSTRACT

An article that facilitates individual expression includes a textile material having an outer surface, and at least one markable portion on the outer surface treated such that the at least one markable portion removably receives indicia marked upon the surface. The markable portion comprises one or more layers of inks that are successively applied to the textile material. A method of making an article that facilitates individual expression includes applying at least one first layer that is at least one of a reducer/base material or a plastisol ink onto at least a portion of a surface of a textile material, and applying at least one layer of plastisol ink onto at least a portion of the first layer.

20 Claims, 3 Drawing Sheets

(56) References Cited

U.S. PATENT DOCUMENTS

| | | | | |
|---|---|---|---|---|
| 7,987,619 | B2 | 8/2011 | McKinney et al. | |
| 2003/0118972 | A1* | 6/2003 | Green | G09B 11/00 434/81 |
| 2005/0022912 | A1 | 2/2005 | Spitzer-Cohn | |
| 2007/0193056 | A1* | 8/2007 | Switalski | F26B 21/10 426/89 |
| 2008/0086793 | A1 | 4/2008 | Higgins | |
| 2011/0271418 | A1 | 11/2011 | Crockett-Grabus | |
| 2013/0115395 | A1* | 5/2013 | Johnson | D06Q 1/10 428/35.2 |
| 2015/0158325 | A1 | 6/2015 | Pineiro et al. | |
| 2017/0095021 | A1* | 4/2017 | Eleish | A41B 1/00 |

OTHER PUBLICATIONS

"Union Ink Company Product Catalog Oct. 2003," https://www.yumpu.com/en/document/view/6476057/application-features-mr-repair, Oct. 2003 (Year: 2003).*

"What is Under Base and Why it is Required for Screen Printing?" printpapa.com, https://web.archive.org/web/20141120191134/https://support.printpapa.com/kb/a361/what-is-under-base-why-it-is-required-screen-printing.aspx#, Nov. 20, 2014 (Year: 2014).*

"Choosing the Right Mesh and Halftone Dot," Combs, https://web.archive.org/web/20150724190353/https://www.atlasscreensupply.com/blog/choosing-the-right-mesh-and-halftone-dot.htm, Jul. 24, 2015 (Year: 2015).*

* cited by examiner

TEXTILE ARTICLE HAVING A SURFACE FOR RECEIVING REMOVABLE INDICIA AND A METHOD OF MANUFACTURE

CROSS-REFERENCE

This application claims the benefit of U.S. Provisional Patent Application Ser. No. 62/270,867, filed Dec. 22, 2015, the disclosure of which is incorporated by reference herein in its entirety.

TECHNICAL FIELD

The present invention relates generally to textile articles and, more particularly, to a textile article have a surface that can removably receive indicia.

BACKGROUND

A textile article provides a way for individuals to express themselves by what they are wearing. For example, individuals may express themselves by choosing to wear a particular fabric color or pattern. Many individuals desire to be highly expressive by wearing apparel or accessories adorned with different graphics, messages, illustrations, or symbols and the like, but may dislike the permanence and inflexibility associated with clothing adorned with only a single design. Clothing having only a single design results in less flexibility with regard to apparel choices, or may require individuals to maintain a large wardrobe for all of the different expressions that the individual may wish to display. At times, such individuals may also desire to express little or no message, or to only provide a subtle decoration, rather than an explicit message.

A need therefore exists for wearable apparel or accessories that can be readily modified to personalize the desired expression of the individual and can subsequently be changed quickly and easily by erasing indicia and then redecorating.

Existing textile chalkboard surfaces can receive limestone chalk markings. However, chalkboard surfaces are not entirely satisfactory. When touched or brushed against, the markings can smudge or be wiped as to inadvertently obscure the desired expression. Moreover, chalk is traditionally a thick and imprecise writing/drawing instrument, and chalk markings are traditionally somewhat muted and diffused. Utilizing limestone chalk generally results in messy dust particles that can be irritating to inhale and can leave residual particles on hands, fingers, or anything it contacts.

A need therefore exists for a writing surface that can erasably and repeatedly receive bold, high contrast, easily legible indicia that is not subject to inadvertent erasure and allows for a neat and dust free marking experience.

SUMMARY

In accordance with the principles of the present disclosure, a method and system are provided for making an article that facilitates individual expression. In one aspect, the article includes a textile material having a surface for receiving removable indicia. In another aspect, there is provided a method of manufacturing an article that can erasably receive markings made with liquid chalk markers, liquid chalk paint, as well as traditional limestone chalk and the like. It will be appreciated that various other marking devices suitable for removably placing indicia on the surface may alternatively be used.

An article in accordance with the principles of the present disclosure is more wearable than existing chalkboard surfaces. For example, the article may result in less physical discomfort for wearers due to its thinner, softer texture, and more flexible and foldable surface for erasably receiving indicia.

An article in accordance with the principles of the present disclosure may be configured to removably receive indicia in the form of liquid chalk marker, liquid chalk paint, limestone chalk, or the like, and then allows erasure with minimal or no residue left on the surface, thereby allowing the article to then receive new markings. This process of selectively marking indicia, removing the indicia, and then marking different indicia can be repeated numerous times as may be desired.

An article in accordance with the principles of the present disclosure creates a barrier between the generally porous material of the textile material and the indicia to better prevent absorption of liquid chalk marker through the surface of the textile material. This allows the markings to be more vibrant and colorful and minimizes undesirable bleeding into textile material or the undesirable spreading of ink.

An article in accordance with the principles of the present disclosure may facilitate the drying of liquid chalk marker indicia soon after application, whereby the article may be readily utilized. Once dry, the indicia resists inadvertent erasure or smudging during normal use as would generally occur with limestone chalk. The marker can then be erased with an appropriate eraser, such as a dampened cloth, paper towel, chalk eraser, other various other materials suitable for removing the indicia. Garments that are prepared in accordance with the principles of the present disclosure may be laundered in accordance with provided washing instructions in a standard, residential washing machine. Accordingly, the surface of such a garment may be returned to its original state once erased or machine washed so that new chalk mark designs can be applied. An article in accordance with the principles of the present disclosure will maintain its integrity after multiple washes, wearing, and uses.

An article in accordance with the principles of the present disclosure erasably receives indicia which can remain on the surface for an extended period of time and still wipe off clean with a wet cloth. This differs from a plain, untreated, cloth surface because when exposed to such markings, such untreated material can undesirably and permanently stain. An article in accordance with the present disclosure differs from a cloth with a standard chalkboard surface because liquid chalk marker can stain or leave residue of indicia on those surfaces.

In accordance with the principles of the present disclosure, the surface for receiving erasable indicia will not become stained with the indicia if appropriate, specified liquid chalk markers are used to create the indicia. While the manufacturers of common liquid chalk markers may not have intended for such markings to be applied to textiles and porous surfaces, and then washed off completely, such markers may be successfully used in this way. Good results may be obtained by employing liquid chalk markers such as BISTRO CHALK MARKER Fine Point, Fluorescent (MARVY UCHIDA of America, Corp., Torrance, Calif.). It will be appreciated that various other suitable devices for marking indicia on an article in accordance with the present disclosure may alternatively be used.

In another exemplary embodiment in accordance with the principles of the present disclosure, a kit is provided that includes one or more of the following: a textile article have a surface for receiving removable indicia, a marking device, an erasing/wiping device, or a stencil that facilitates applying indicia to the article.

In another exemplary embodiment in accordance with the principles of the present disclosure, a writing implement may be coupled with the textile article, or may be worn as an accessory such as a bracelet or necklace, for easy access to then use the implement to apply indicia to an article provided in accordance with the principles of the present disclosure.

In another exemplary embodiment, an article in accordance with the principles of the present disclosure may include raised or elevated portions as part of the surface that can erasably receive indicia. In another aspect, such raised portions may be located proximate the surface. In yet another aspect, the raised portions may define at least a portion of a border that surrounds the surface. The raised or elevated portions may provide a delineation that separates those surfaces intended to receive the indicia from other portions of the article that are not intended to receive indicia.

In another exemplary embodiment, an article in accordance with the principles of the present disclosure may include textile material that defines a patch that can be coupled with a separate object, such as an item of clothing, a piece of furniture, or any other object as may be desired. In one aspect, the patch may be coupled with the object by heat transfer, by sewing, or by any other suitable method.

In one aspect, an article in accordance with the principles of the present disclosure may be in the form of a bag (e.g. messenger bag, knapsack, tote), apparel (e.g. shirt, bottoms, sweatshirt, shoes, dress), accessories (e.g. caps, scarves, shoes, gloves), furnishings (e.g. seat cushions, wall hanging), or various other products that include textile material, or that can be made with textile material.

In another aspect, the surface upon which indicia may be erasably applied can be of any desired shape, and may include one or more non-erasable portions or features (such as graphics or other designs or decorations).

In another aspect, the surface upon which indicia may be erasably applied may be provided in any color desired.

An article in accordance with the present disclosure overcomes the foregoing and other shortcomings of existing markable surfaces. While various embodiments are discussed in detail herein, it will be understood that the invention is not limited to these embodiments. On the contrary, in accordance with the principles of the present disclosure, it includes all alternatives, modifications and equivalents as may be included within the spirit and scope of the present invention.

DETAILED DESCRIPTION

Figure 1:
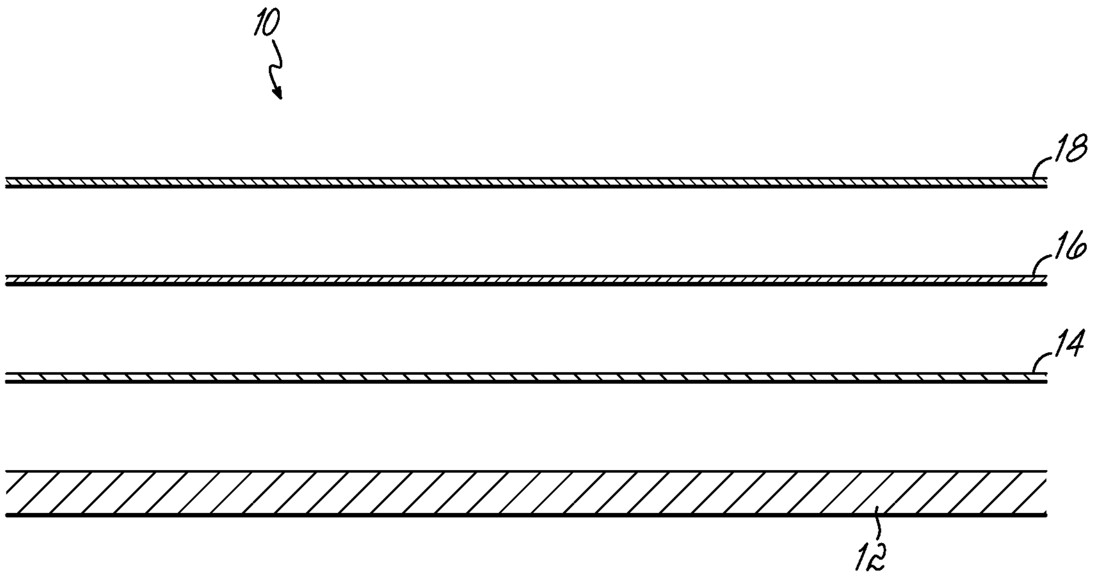
FIG. 1 is an exploded, cross-sectional, schematic illustration depicting an exemplary article in accordance with the principles of the present invention (not to scale).
Figure 1A:
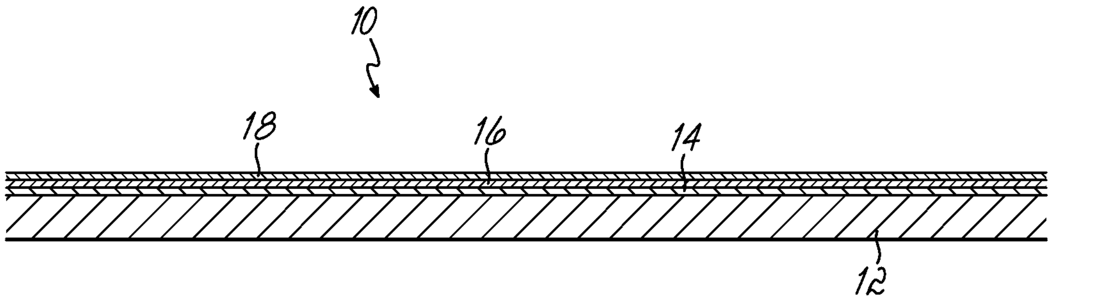
FIG. 1A is a cross-sectional, schematic illustration of the exemplary article of FIG. 1.

FIGS. 1 and 1A illustrate a process for making an article 10 in accordance with the principles of the present disclosure, wherein one or more layers of material are applied to the surface of a substrate 12 to create at least one markable portion on the substrate that can erasably receive indicia. In one embodiment, the substrate 12 may be a textile material such as an article of clothing, an item of furniture, or any other item made from or including textile material. While the substrate 12 has been shown and described herein as being a textile material, it will be appreciated that the methods in accordance with the principles of the present disclosure may be used to create a markable portion on various other substrates, in particular flexible or porous substrates.

In the exemplary embodiment shown, at least one first layer 14 of reducer/base material is applied to the desired surface of the substrate 12. Good results have been obtained using a curable reducer/base such as NPT Chino Base and Reducer, available from RUTLAND PLASTIC TECHNOLOGIES, INC, Pineville, N.C., and applying the layer 14 using conventional screen printing procedures, either manually or automatically, and a mesh screen size of 110. After the at least one layer 14 of reducer/base material has been applied to the surface of the substrate 12, the reducer/base layer 14 is allowed to cure. In one embodiment, the reducer/base layer 14 may be flash cured using a flash dryer. As a non-limiting example, the reducer/base layer 14 may be cured using a flash dryer at 400 degrees Fahrenheit for about 4 seconds.

After the reducer/base layer 14 has cured, one or more second ink layers may be applied to at least a portion of the reducer/base layer 14. In the embodiment shown, first and second ink layers 16, 18 of plastisol ink (e.g., plastisol chalkboard ink) are applied generally onto the reducer/base layer 14 using traditional screen printing methods or procedures and a mesh screen size of 158. An exemplary plastisol ink is EF Chalkboard Plastisol, PLFE-CK800 Chalkboard Black available from UNION INK of Pineville, N.C. After the first plastisol chalkboard ink layer 16 is applied, the applied layer 16 is allowed to cure such as by using a flash dryer. After the second, or final, plastisol chalkboard ink layer 18 has been applied, the substrate 12 may be cured in a conveyor tunnel dryer. As a non-limiting example, the substrate 12 may be cured using a conveyor tunnel dryer at 400 degrees Fahrenheit for about 10 minutes to 20 minutes. After the final curing step, the entire article 10 may be heat pressed if desired.

While the exemplary method described above has been shown and described as applying a single layer 14 of reducer/base material and two layers 16, 18 of plastisol chalkboard ink, it will be appreciated that various other numbers of layers of reducer/base and/or plastisol chalkboard ink may alternatively be used to produce a suitable markable portion on the surface of a substrate 12. As a non-limiting example, an alternative process for making an article 10 in accordance with the principles of the present disclosure may include applying plastisol ink onto the substrate 12 as the first layer instead of a reducer/base material. The article 10 may thereafter be processed as described above. In addition, various other types of inks, such as, but not limited to, water-based inks or discharge inks, for example, may be used to produce a suitable markable portion on the surface of a substrate 12. Moreover, various other mesh screen sizes may be used to apply the reducer/base layer 14 and/or the plastisol chalkboard ink layers 16, 18. As non-limiting examples, the plastisol chalkboard ink layers 16, 18 may alternatively be applied using a mesh screen size of 110 or various other suitable mesh screen sizes. In another embodiment, the applied layers may be screen printed onto the substrate using mesh screen sizes in the range of 80 to 400. Moreover, while the application of layers 14, 16, 18 of material to the substrate 12 has been described above with respect to screen printing, it will be appreciated that various other methods for applying the layers 14, 16, 18 of material to a substrate 12 may alternatively be used, such as but not limited to, application by paint brush, roller, spraying, sponging, air brushing, squeegeeing without a screen, and various other suitable methods. While curing of the applied layers has been described above using flash dryers and conveyor tunnel dryers, it will be appreciated that various other methods and apparatus suitable for curing the applied layers may alternatively be used.

Figure 2:
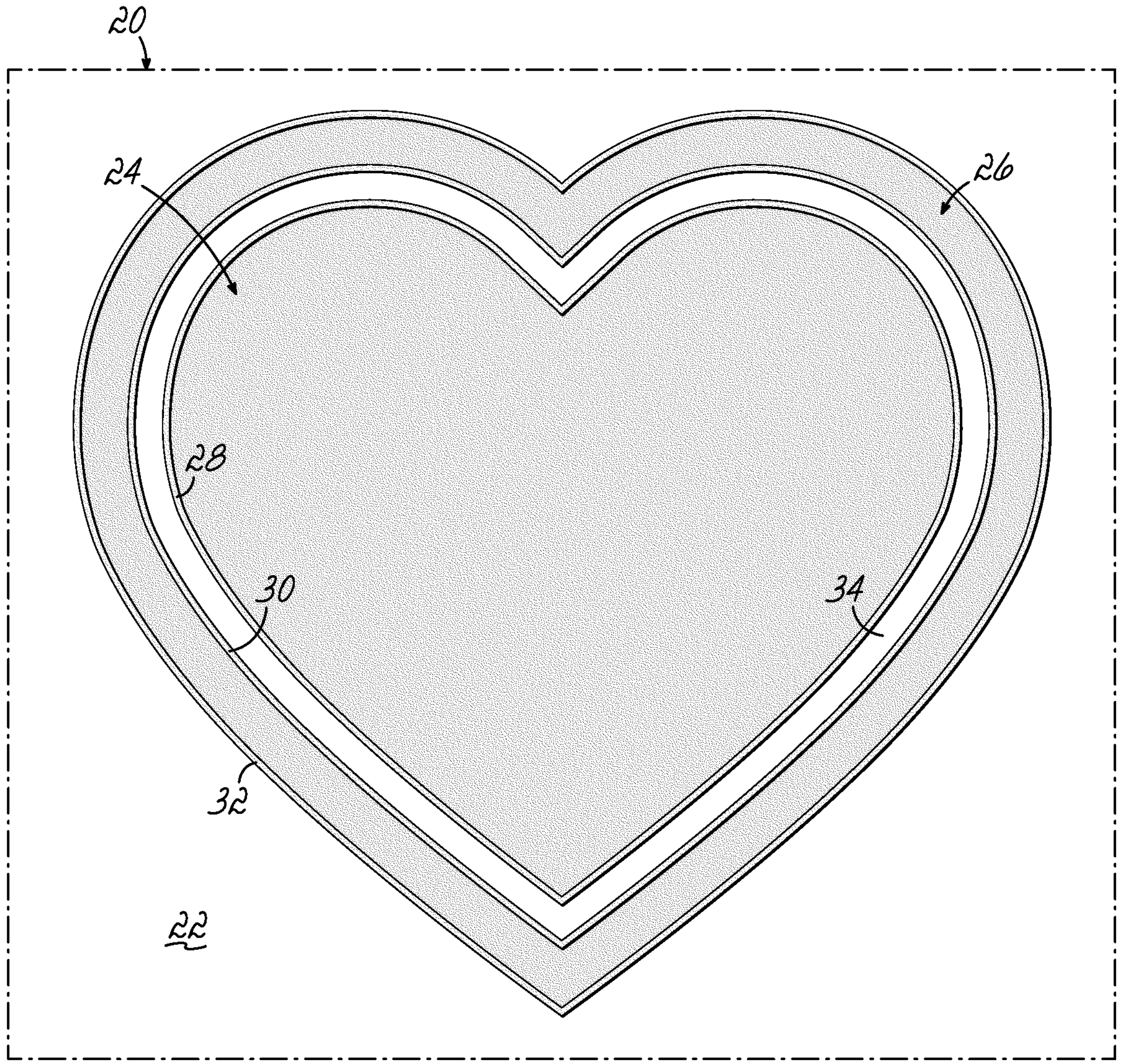
FIG. 2 is a plan view of another exemplary embodiment of an article in accordance with the principles of the present invention.
Figure 2A:
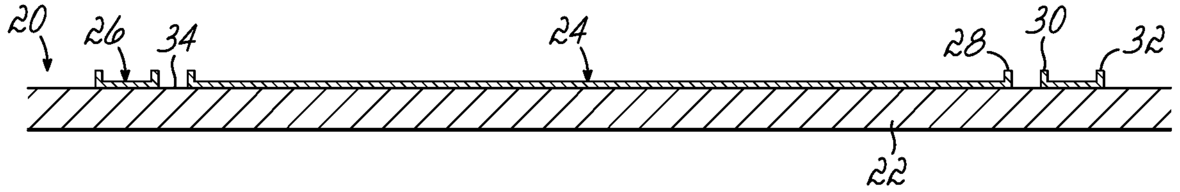
FIG. 2A is a cross-sectional view illustrating a raised border of the article of FIG. 2.

FIGS. 2 and 2A illustrate an exemplary article 20 in accordance with the principles of the present disclosure, wherein at least one markable portion is provided on an outer surface of a substrate 22, such as a textile material. In the embodiment shown, the article 20 includes first and second markable portions 24, 26 generally in the form of a heart-shaped design. The article 20 further includes at least one raised portion integrated with the markable portions 24, 26 to provide an aesthetically pleasing appearance and/or to define borders associated with the markable portions 24, 26 which may also serve functional purposes. In the embodiment shown, the article 20 includes first, second, and third raised portions 28, 30, 32 defining borders between the first and second markable portions 24, 26 and at least one portion 34 of the substrate 22 that is not intended to receive indicia. Specifically, the first raised portion 28 defines an enclosed heart-shaped area defining a border around the first markable portion 24. The second raised portion 30 has a shape generally similar to the first raised portion 28 and is spaced outwardly therefrom to define the portion 34 that is to remain mark free. The third raised portion 32 has a shape generally similar to the second raised portion 30 and is spaced outwardly therefrom to define an area corresponding to the second markable portion 26 of the article 20. The raised portions 28, 30, 32 of the article 20 may be created by varying the thickness of the layers 14, 16, 18 of material applied to the substrate 22 (as described above), or by applying additional layers of material to selected portions of the article 22. Alternatively, the raised portions 28, 30, 32 of the article 20 may be created by various other methods or materials applied to the substrate 22.

Figure 3A:
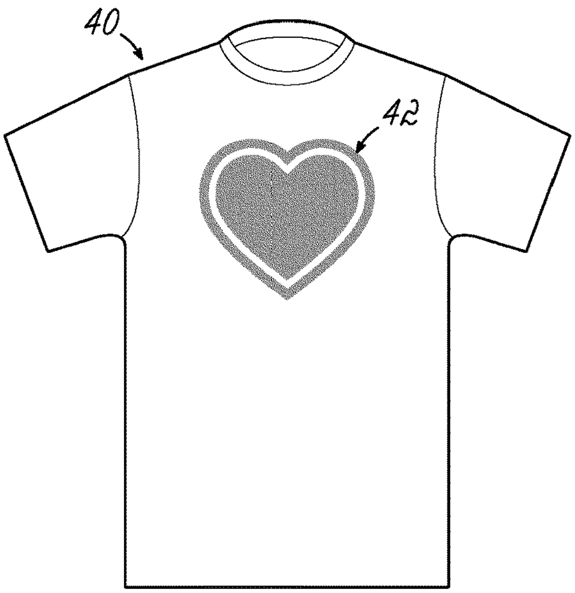
FIGS. 3A-3D illustrate an exemplary method of using the article in accordance with the principles of the present invention.
Figure 3B:
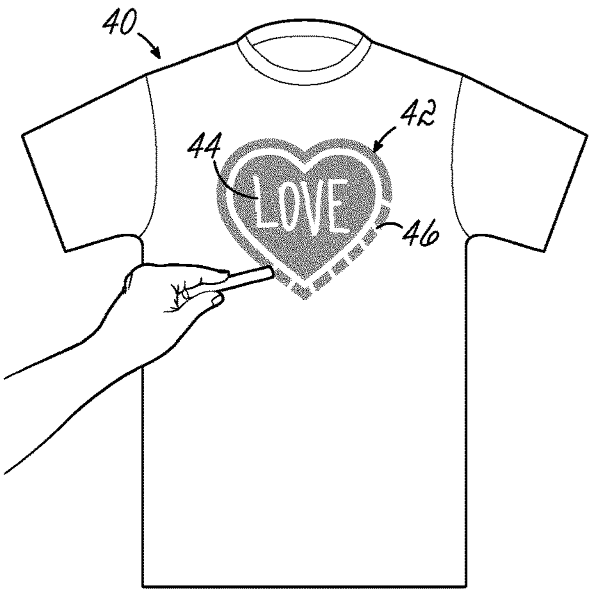
Figure 3C:
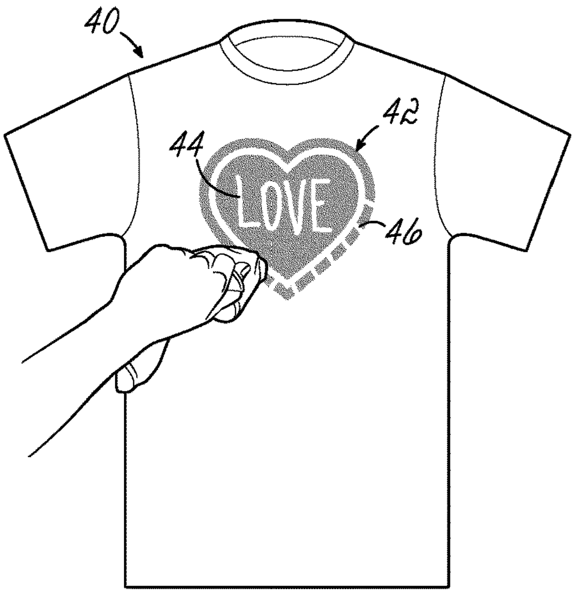
Figure 3D:
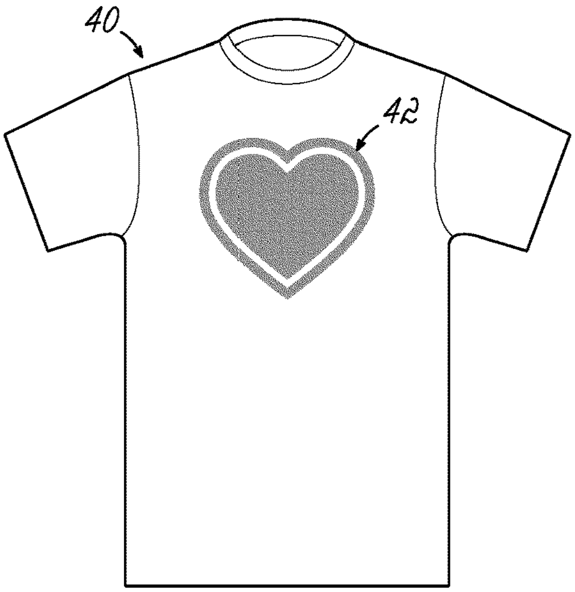

FIGS. 3A-3D illustrate a method of using an article 40 in accordance with the principles of the present disclosure. In FIG. 3A, the article 40 is in the form of a T-shirt and may be placed on a flat surface to facilitate applying indicia to the at least one markable portion 42 of the article 40. In FIG. 3B, desired indicia 44, 46 is applied to the markable portion 42 of the article 40 using limestone chalk or liquid chalk marker, for example. After the desired indicia 44, 46 has been applied to the markable portion 42, the article 40 is ready to be worn. When it is desired to remove or modify the previously applied indicia 44, 46, the markable portion 42 may be wiped using a cloth dampened with water to remove some or all of the previously applied indicia 44, 46, as illustrated in FIG. 3C. Alternatively, the entire article 40 may be washed using a conventional washing machine, for example, to remove the previously applied indicia 44, 46 during laundering of the article 40. Once the previously applied indicia 44, 46 is removed as depicted in FIG. 3D, the article 40 is ready to receive other indicia which may be applied as described above.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A textile article for individual expression, comprising:

a textile material having an outer surface; and a barrier disposed on and covering a portion of the outer surface, the barrier having a plurality of layers including a first layer comprised of a base material and at least one plastisol ink layer comprising a chalkboard ink disposed on the first layer, wherein the barrier is configured to be capable of removably receiving, displaying, limiting movement of a liquid chalk, and capable of erasure of the liquid chalk by wiping without leaving a residue on the barrier, the barrier configured to be capable of preventing the liquid chalk from being absorbed into the portion of the outer surface of the textile material.

2. The textile article according to claim 1, wherein the chalkboard ink is EF Chalkboard Plastisol, PLFE-CK800 Chalkboard Black or combinations thereof.

3. The textile article according to claim 1, wherein at least one of the plurality of layers includes a reducer.

4. The textile article according to claim 1, wherein at least one of the top and bottom layers is cured.

5. The textile article according to claim 1, further comprising:

an elevated border made of the same material as the barrier, wherein the elevated border extends upward from and defines a radially outer boundary of the treated writing surface.

6. The textile article according to claim 5, wherein the elevated border is integrally formed with the layers of the barrier.

7. The textile article according to claim 6, wherein at least one of the layers of the barrier has a respective thickness which is larger along the elevated border than radially inward of the radially outer boundary.

8. The textile article according to claim 1, wherein the liquid chalk is disposed on the barrier.

9. A method of making a textile article for individual expression, the method comprising:

applying a first layer comprised of a base material onto a portion of an outer surface of a textile material;

applying at least one additional layer comprised of plastisol ink which comprises a chalkboard ink onto the first layer;

curing the at least one plastisol ink layer to produce a barrier configured to be capable of removably receiving, displaying, limiting movement liquid chalk, and capable of erasure of the liquid chalk by wiping without leaving a residue on the barrier, wherein applying the at least one plastisol ink layer includes moving the plastisol ink through a mesh screen having a screen size in the range of 80 to 400, wherein the first layer and the at least one additional plastisol ink layer form the barrier configured to prevent the liquid chalk if applied to the barrier from being absorbed into the portion of the outer surface of the textile material.

10. The method according to claim 9, further comprising: optionally applying the liquid chalk to the barrier of the textile article.

11. The method according to claim 9, further comprising: curing the at least one plastisol ink layer with a flash dryer; and/or heat pressing the textile material, the first layer, and the at least one plastisol ink layer.

12. The method according to claim 11, wherein applying the first layer includes moving the base material through a mesh screen having a screen size of 110.

13. The method according to claim 11, wherein the mesh screen has a screen size of 158.

14. The method according to claim 11, wherein applying the first and at least one plastisol ink layers includes forming an elevated border around a peripheral boundary of the treated writing surface by increasing a respective thickness of at least one of the first and at least one plastisol ink layers along the peripheral boundary.

15. A textile article comprised of a porous substrate for individual expression prepared by a process comprising the steps of:

applying a first layer comprised of a base material to the porous substrate with a mesh screen size in the range of 80 to 400 to form a base layer on the porous substrate;

flash curing the base layer with a flash dryer;

applying at least one plastisol ink layer comprising a chalkboard ink to at least a portion of the base layer;

curing the at least one plastisol ink layer, wherein the base layer and the plastisol ink layer form a barrier which is configured to be capable of removably receiving, displaying, limiting movement of liquid chalk, and capable of erasure of the liquid chalk by wiping without leaving a residue on the barrier.

16. The textile article for individual expression prepared by a process according to claim 15, wherein the at least one plastisol ink is cured at about 400 degrees Fahrenheit for about 10 to 20 minutes and the flash curing of the base layer with a flash dryer is done at about 400 degrees Fahrenheit for about four seconds.

17. The textile article for individual expression prepared by a process according to any one of claim 9 or 15, wherein the first layer is also a plastisol ink.

18. The textile article for individual expression prepared by a process according to any one of claim 9 or 15, wherein the textile article is a T-shirt or a patch.

19. The textile article of claim 15, wherein the mesh screen size is 110 or 158.

20. A textile article for individual expression, comprising:

a textile material having an outer surface;

a barrier disposed on and covering a portion of the outer surface, the barrier having a plurality of layers including a first layer comprised of a base material and at least one plastisol ink layer comprising a chalkboard ink disposed on the first layer, and liquid chalk optionally disposed on the at least one plastisol ink layer, wherein the barrier is capable of removably receiving, displaying, limiting movement of the liquid chalk, and capable of erasure of the liquid chalk from the barrier by wiping without leaving a residue on the barrier, the barrier configured to prevent the liquid chalk from being absorbed into the portion of the outer surface of the textile material.

* * * * *